Oct. 5, 1926.
C. E. BONNETT
ARTIFICIAL BAIT FOR FISHING
Filed May 10, 1923
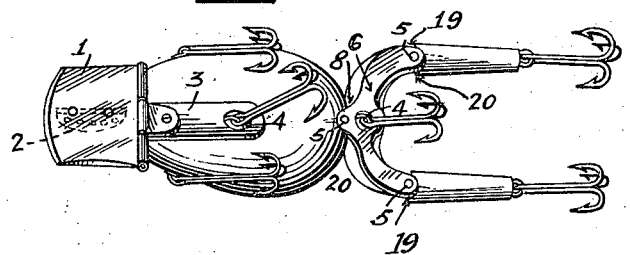
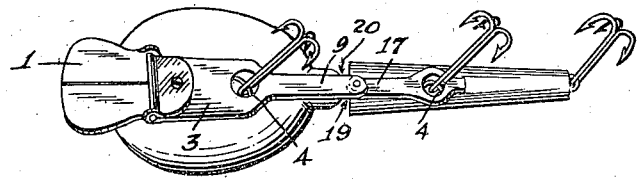
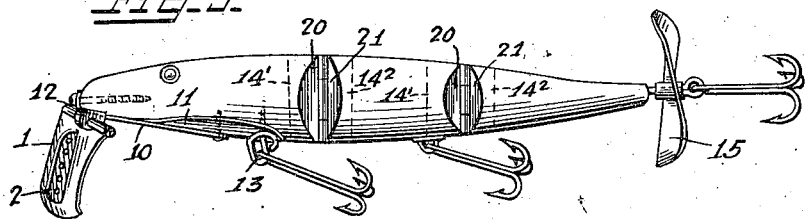
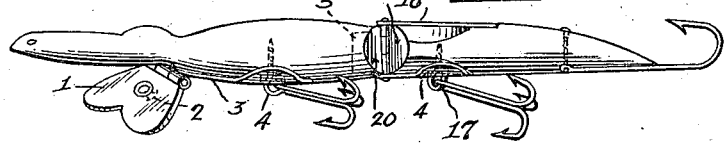
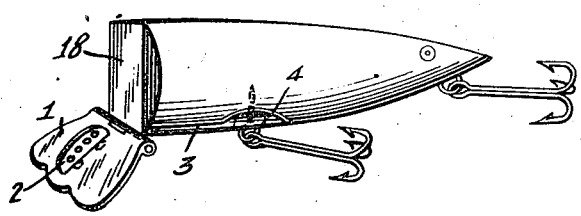
Inventor:
Clarence Elmore Bonnett Patented Oct. 5, 1926.

1,602,329

UNITED STATES PATENT OFFICE.

CLARENCE ELMORE BONNETT, OF NEW ORLEANS, LOUISIANA.

ARTIFICIAL BAIT FOR FISHING.

Application filed May 10, 1923. Serial No. 638,026.

The invention relates to artificial baits for fishing and belongs to the class of articulated vibrating baits.

An object of the invention is to provide an artificial bait having the life-like movements of the natural bait.

A further object of the invention is to provide an artificial bait with devices for controlling the degree of vibration and the depth the bait travels in the water.

A further object of the invention is to provide an artificial bait that is practically snagless.

In the drawings,

Figure 1 is a ventral view of an artificial frog on which are shown a hinged primary retarder with an eyelet block riveted thereon, eyelet sockets formed integrally with certain hinge parts, secondary retarders formed on the forward ends of the second and successive sections of the bait, and specially devised hinge parts to connect the sections of the bait. Figure 2 shows a ventral view of a tadpole with the hinged primary retarder, eyelet block, eyelet sockets in hinge parts, a secondary retarder, and a hinge connecting the sections of the bait. Figure 3 shows a side view of a minnow with hinged primary retarder and a modified means of attachment, secondary retarders and hinges connecting together the sections of the bait. Figure 4 is a side view of an artificial crawfish, on which are shown the hinged primary retarder and an eyelet block riveted thereon, an eyelet socket formed integrally with a hinge part, and a secondary retarder formed on the forward end of the main section of the bait. Figure 5 shows a side view of a lizard with the pivoted primary retarder and an eyelet block containing only one hole, eyelet sockets formed integrally with certain hinge parts, a secondary retarder, and a hinge connecting the two main portions of the bait.

Reference to the drawings in detail shows the hinged primary retarder: in Figure 1, numeral 1, the preferred form of the pivoted primary retarder is shown, cupped on the forward side, but with the lower edge bent backward about 30 degrees. The eyelet block is shown in dotted outline riveted on the retarder, and contains a series of holes. In Figure 2 one of the many possible modifications of the pivoted primary retarder is shown, numeral 1, and in this figure the retarder is a plane surface with the eyelet block containing a series of holes. Figure 3 shows another method of hinging the retarder, numeral 1, which otherwise conforms to the preferred form in Figure 1. Figure 4, numeral 1, shows still another of the many possible modifications in the primary retarder, numeral 1, since the lower edge is formed in three lobes. The eyelet block, numeral 2, is shown riveted on the retarder, and is shown with a series of holes. In Figure 5, the primary retarder is shown with two lobes, and is a plane surface. On the retarder, numeral 1, is riveted an eyelet block containing only one hole. The modifications shown are offered as illustrations of the many possible modifications, and must not be regarded as limitations on the principle. The eyelet block, numeral 2, in all of the drawings is preferably made with a series of holes, since the insertion of the connecting snap in the various holes allows for a range in the rate of vibration and the depth the bait will travel in the water, and at the usual rate of reeling in the bait,—if the snap is placed in the upper hole the bait will travel on the surface of the water, if in the lower hole, the bait will go deep in the water. The freely pivoted retarder, placed at the forward part of the bait on the ventral side weights the bait to the proper position in the water, so that the bait will not turn on its back or otherwise refuse to function like some other wiggling types of baits do.

In Figure 1, the eyelet socket 4 is shown formed in the hinge parts 3 and 6, ventral view. These sockets are for the eye screw that holds the hooks suspended from the bait. In Figure 2, the eyelet socket 4 is shown integrally formed with hinge parts 3 and 17, so that hooks may thus be attached to the bait as indicated above. In Figure 3, however, the hooks are attached by means of a different type of screw, 13, and so no socket is made in this hinge part. In Figure 4, a side view of the formation of the eyelet socket 4 in hinge part 3, is shown, and hooks are attached in the usual manner. In Figure 5 a side view of eyelet sockets is shown in hinge parts 3 and 17, and treble hooks are attached by eye screws that set in these sockets.

In Figure 1, the hinge part 3 is shown with its forward end bent back and fastened to the bait with a screw; the hinge part 6 is shown as one piece with pivot holes at three points and with the hinge parts 5, make three separate hinges. A plate on the dorsal side corresponds to the hinge part 6 shown on the ventral side, but the plate has no eyelet socket. The hinge parts 5 are parts of the butt type of hinge. In Figure 2 the hinge part 3 is similar to hinge part 3 in Figure 1, but with one modification, namely its extension 9, which connects with hinge part 17 to form a hinge to connect the main sections of the bait, on the ventral side. On the dorsal side, two short straps like the extension 9 of part 3, complete the hinge. In Figure 3, the hinge part 11 is slotted so that the retarder may be slid backward or forward along the ventral side of the first section, and the eyelet hook 13 is used as an adjusting screw to hold the part 11 rigid at the desired position. The part 10 is a guide extending from the screw 12 backward and on the outside of the part 11 to a position immediately in front of the adjusting screw 13; its purpose is to hold the sliding part 11 rigid to all other movements but that of sliding forward or backward. The hinge parts 14 are butt type of hinges used to connect the main sections of the bait together. These parts are preferably made by bending a piece of sheet metal in the middle and slotting one part to receive the other. In Figure 5, the hinge connecting the two main sections is made up of a hinge part 5 and two strap hinge parts 16 above, and 17 below. As in all other cases where hinge parts 5 are used, a pivot pin is used to pivot together the separate parts. The strap hinges may be connected by riveting together each pair of straps.

In Figure 1, secondary retarders are placed on the forward end of the second section and on each of succeeding sections; on the second section, this retarder is formed by cupping the forward end, and is indicated by the numeral 8. The retarders on the succeeding sections are square-shaped ends on the forward portions and are indicated by the numeral 19. In Figure 2, the retarder 19 is square ended on the forward end of the second section. In Figure 3, the retarders 21 on the forward ends of the second and third sections respectively are cup-shaped with the open end of the cup forward. These retarding surfaces can function only when a portion of the rear end of the section preceding have been cut away in a wedge-like manner, and this wedge-shaped end is indicated by the numeral 20. In Figure 4 the square shaped end on the main section forms a secondary retarder (18). In Figure 5, the secondary retarder 22, extends out on each side, to resemble somewhat the legs of the lizard.

I claim as new and my invention,

1. An artificial bait consisting of a retarder attached to the forward ventral end of the bait, freely pivoted at its upper end on which retarder is placed means for attaching the line to the bait, eyelet sockets formed integrally in hinge parts, and hooks attached to the bait.

2. An artificial bait consisting of a retarder attached to the forward ventral portion of the bait, freely pivoted at its upper end, on which retarder is placed an eyelet block containing a series of holes by which means the bait is attached to the line, eyelet sockets formed integrally in hinge parts, secondary retarders formed integrally of sections of the bait, hinges connecting the sections of the bait, and hooks attached to the bait.

3. An artificial bait consisting of a retarder attached pivotally to the forward ventral section of the bait by means of a slotted adjustable hinge part and guide, on which retarder is placed an eyelet block for attaching the line to the bait, secondary retarders formed integrally of the forward end of the rearward section, hinges connecting the sections of the bait, and hooks attached to the bait.

CLARENCE ELMORE BONNETT.